Feb. 23, 1954
K. C. KIMERER
2,670,245
HUBCAP SECURING MEANS
Filed Nov. 30, 1951
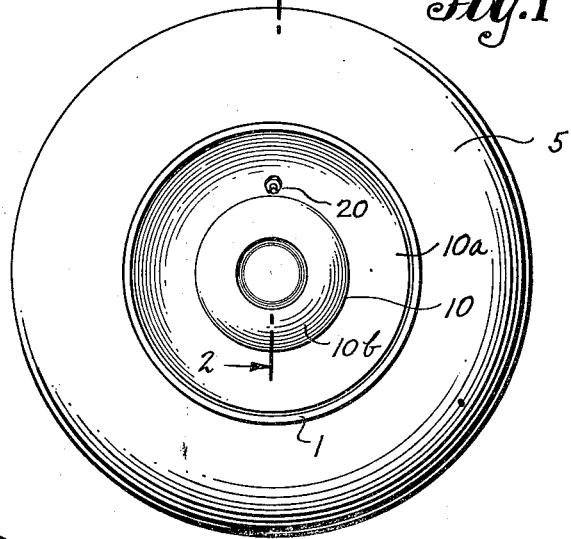
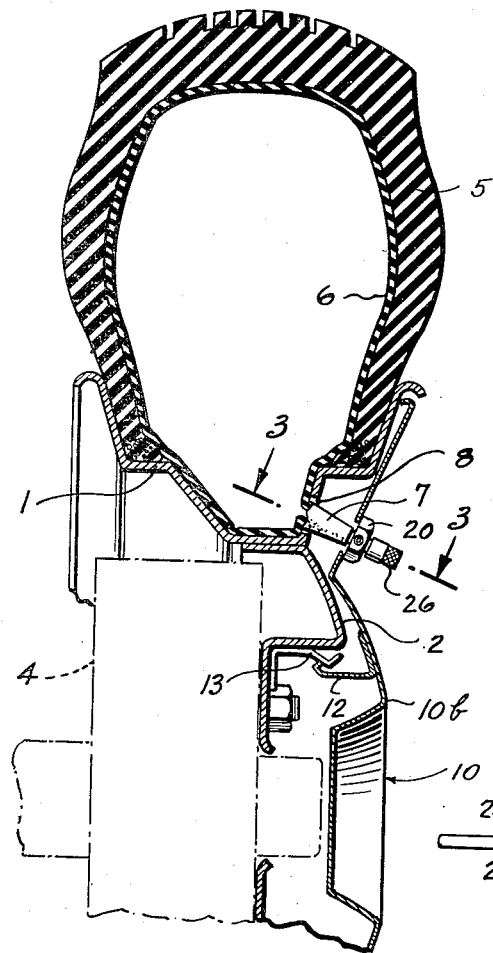
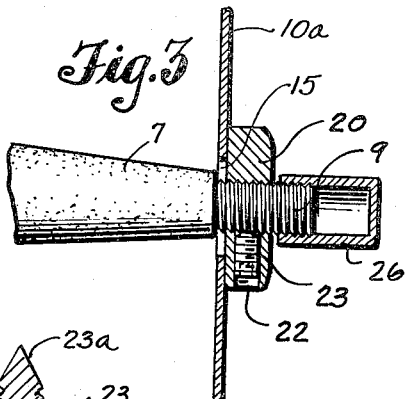
INVENTOR.
KEITH C. KIMERER
BY
Cook + Robinson
ATTORNEYS Patented Feb. 23, 1954

2,670,245

UNITED STATES PATENT OFFICE 2,670,245

HUBCAP SECURING MEANS

Keith C. Kimerer, Seattle, Wash.

Application November 30, 1951, Serial No. 259,119

1 Claim. (Cl. 301—37)

This invention relates to a means for preventing theft of hub caps as applied to the wheels of automobiles, and it has reference more particularly to a means that is designed for use in connection with hub caps which are of relatively large size and through which the valve stem of the tire that is applied to the wheel projects for the inflating of the tire.

For better understanding of the present invention, it will here be explained that certain present day automobiles have their wheels equipped with hub caps that are substantially of the full diameter of the rim on which the pneumatic tire is mounted and the tire inflating stem is of a flexible character and extends from the tire freely through a hole in the hub cap for the application thereto of the inflating hose. It will also be explained that it is a common occurrence that such hub caps become lost or are stolen; and it has been quite definitely established that such theft is for the greater part practised by juveniles and not by persons who are equipped to practise such theft where hub cap locks are employed.

In view of the above explanatory remarks, it has been the principal object of this invention to provide simple and effective means for locking the hub cap to the tire valve stem and in this way prevent the theft of the hub cap without destruction to the valve stem; it being the belief that if the removal of the hub cap is made difficult, or in some way caused to be a time consuming problem, then the theft of such would be discouraged to a great extent.

It is also an object of the present invention to provide a locking nut that can be readily applied to the threaded end portion of the tire valve stem and then secured by means that requires a special tool for its release, thus to add difficulties to the theft of the hub cap.

Further objects of the invention reside in the details of construction and combination of parts and their mode of application and use as will hereinafter be fully described.

In accomplishing these and other objects of the invention, I have provided the improved details of construction, the preferred forms of which are illustrated in the accompanying drawings, wherein—

Fig. 1 is a side view of an automobile wheel having a hub cap applied thereto and secured by a locking means embodied by the present invention.

Fig. 2 is an enlarged, cross-sectional view of a part of the wheel with tire and hub cap applied thereto; the view being taken on the line 2—2 in Fig. 1.

Fig. 3 is an enlarged sectional detail through a part of the hub cap, showing the tire stem as applied through a hole formed therein, and equipped with a locking nut in accordance with the objects of the present invention; the view being taken on the line 3—3 in Fig. 2.

Fig. 4 is a sectional detail of the locking screw and a turning tool therefor.

Referring more in detail to the drawings—

1 designates the rim portion of an automobile wheel and 2 a wheel body or rim mounting disk of special form about which the rim 1 is applied and secured in any suitable manner. The disk 2 is here shown to be of that type adapted to be bolted to a brake drum or the like as indicated by numeral 4, or to be otherwise coaxially secured to a wheel mounting hub. Applied to the rim 1, in the usual manner, is a tire casing 5, containing an inner tube 6 from which a valve stem 7 extends outwardly through an opening 8 provided therefor in the rim. At its outer end, the stem 7 mounts the externally threaded, tubular stem 9 to which an air hose can be applied for inflating the tire and within which tubular stem the usual air retaining check valve, not herein shown, is contained.

Applied to the outer face of the wheel is a hub cap 10. This can be made in various designs, or shapes, and can be removably secured to the wheel disk 2 in various ways. As seen in Fig. 2, the hub cap is of such diameter that its peripheral portion 10a engages against the outer side of the tire mounting rim and it has a dished central portion 10b to which a plurality of angularly spaced spring clips 12 are secured for holding contact with opposedly related clips 13 fixed to the disk 2. When the hub cap 10 is properly applied, the threaded outer end portion 9 of stem 7 extends through a small circular hole 15 in the part 10a of the hub cap, as shown in Fig. 3, for easy application thereto of the air hose used for inflating the tire.

The present invention resides in the locking of the hub cap to the tire valve stem 7 so that the cap cannot be easily removed from the wheel. In its present preferred form, the locking means comprises a nut 20 that is threaded onto the stem portion 9 against the hub cap about the periphery of the hole 15. The nut is radially tapped to provide an internally threaded hole 22 in which a locking screw 23 is contained. The screw has a pointed inner end portion 23a and when the screw is functionally applied, this is tightened against the stem portion 9 and embedded therein to prevent turning the nut. The screw 23 terminates within the nut and is formed at its outer end with a socket 24 or a head of special shape to receive a screw turning tool that fits that particular shape of socket or head. Preferably the screw would have a squared socket 24 as shown in Fig. 4 to receive an end portion of a turning tool as designated at 25.

It is the belief that by so securing the nut 22, it will be made difficult to remove by one not having the special tool, and by reason of this, the theft of hub caps that are so secured will be discouraged.

Securing nuts of various kind other than that shown may be employed without departing from the spirit of the invention; it being anticipated also that locking devices of various kind be adapted to be slipped over and secured to the stem 9 to serve this particular use, and that they might also comprise hinged sections, designed to be opened apart for their application to the stem 9 and then clamped thereagainst and secured by a key. The locking nut might also be incorporated with the usual closure cap for the stem 9. In Figs. 2 and 3 the stem cap 26 is shown as separate from the locking nut.

It is not the intent that the present invention be limited to the specific form of lock shown but that it shall include any practical form of securing means that can be readily applied to the stem 9 and locked against easy removal except by a person having a special lock releasing tool.

Having thus described my invention, what I claim is new therein and desire to secure by Letters Patent is—

An automobile wheel having a rim formed with a side opening and a pneumatic tire carried by the rim and having an inflating stem passing outwardly through the side opening in the rim and terminating in a threaded cap-receiving outer end portion, a stiff hub cap removably secured against the outer side of said wheel and having a marginal portion overlapping the outer side of the rim and formed with an opening through which the threaded outer end portion of the inflating stem passes and projects outwardly from the said marginal portion of the hub cap, a separate securing nut for the hub cap screwed upon the threaded end portion of said inflating stem and bearing against a marginal portion of the hub cap about the opening therein, said nut being formed with a threaded radially extending side opening open at both inner and outer ends, a locking screw in the threaded opening of said nut having its outer end spaced inwardly from the outer end of the threaded opening and provided with a wrench-engaging portion, the inner end of the screw being tapered to a point and disposed in penetrating engagement with threads of the inflating stem and thereby locking the nut upon the inflating stem when the screw is tightened, and a separate cap screwed upon the outer end of the inflating stem in enclosing and shielding relation thereto and being removable from the inflating stem independent of the nut whereby air may be forced through the inflating stem and into the tire without disturbing said nut.

KEITH C. KIMERER.

References Cited in the file of this patent

UNITED STATES PATENTS

| Number | Name | Date |
|---|---|---|
| 1,150,689 | Mahony | Aug. 17, 1915 |
| 1,292,707 | Clark | Jan. 28, 1919 |
| 2,048,442 | Frank | July 21, 1936 |
| 2,076,789 | LeJeune | Apr. 13, 1937 |
| 2,464,077 | Dicks | Mar. 18, 1949 |

FOREIGN PATENTS

| Number | Country | Date |
|---|---|---|
| 790,848 | France | Nov. 28, 1935 |
| 471,936 | Great Britain | Sept. 14, 1937 |